United States Patent [19]
Webb et al.

[11] Patent Number: 5,754,810
[45] Date of Patent: May 19, 1998

[54] SPECIALIZED MILLICODE INSTRUCTION FOR CERTAIN DECIMAL OPERATIONS

[75] Inventors: Charles Franklin Webb, Poughkeepsie; Mark Steven Farrell, Pleasant Valley; Charles Lewis Cross, Kingston; Nishit Hemantkumar Gokli, Wappingers Falls; Wen He Li, Poughkeepsie, all of N.Y.

[73] Assignee: International Business Machines Corporation, Armonk, N.Y.

[21] Appl. No.: 614,249

[22] Filed: Mar. 12, 1996

[51] Int. Cl.$^6$ ....................... G06F 3/00
[52] U.S. Cl. ............ 395/376; 395/800; 364/736; 364/778
[58] Field of Search ............ 395/375, 800, 395/376; 364/268, 778, 781, 736, 715

[56] References Cited

U.S. PATENT DOCUMENTS

| | | |
|---|---|---|
| 3,990,054 | 11/1976 | Perlowski . |
| 4,109,310 | 8/1978 | England et al. ............ 395/375 |
| 4,141,005 | 2/1979 | Bonner et al. ............ 341/60 |
| 4,366,537 | 12/1982 | Heller . |
| 4,569,061 | 2/1986 | Hao et al. ............ 395/375 |
| 4,589,065 | 5/1986 | Auslander . |
| 4,595,911 | 6/1986 | Kregness et al. ............ 341/78 |
| 4,638,450 | 1/1987 | Stoffers ............ 364/715.01 |
| 4,644,489 | 2/1987 | Curtin et al. ............ 364/736 |
| 4,809,157 | 2/1989 | Eilert . |
| 4,901,233 | 2/1990 | Liptay . |
| 5,003,468 | 3/1991 | Watanbe . |
| 5,136,696 | 8/1992 | Beckwith . |
| 5,226,164 | 7/1993 | Nadas . |
| 5,261,084 | 11/1993 | Hashiguchi . |
| 5,276,891 | 1/1994 | Patel ............ 395/375 |
| 5,280,593 | 1/1994 | Bullions . |
| 5,307,504 | 4/1994 | Robinson . |
| 5,333,287 | 7/1994 | Buerkle . |
| 5,335,334 | 8/1994 | Takahashi . |
| 5,341,482 | 8/1994 | Cutler . |
| 5,345,567 | 9/1994 | Hayden . |
| 5,426,783 | 6/1995 | Norrie et al. ............ 395/800 |

OTHER PUBLICATIONS

IBM TDB vol. 35, No. 4A, Sep. 1992 "Milli–Code", Bullions et al.

*Primary Examiner*—William M. Treat
*Assistant Examiner*—Saleh Najjar
*Attorney, Agent, or Firm*—Lynn L. Augspurger; Laurence J. Marhoefer

[57] ABSTRACT

A millicode method for packing the hexadecimal digits from a plurality of bytes in each of two millicode registers (R1,R1) into one of the two millicode registers extracts the rightmost hexadecimal digit from each of a plurality of bytes stored in millicode register R1 and the rightmost hexadecimal digit from each of a plurality of bytes stored in millicode register R2 and stores hexadecimal digits from said extracting step in millicode register R1 with each hexadecimal digit extracted from a byte in register R1 and from a byte in register R2 stored in millicode register R1 in register R1 positions occupied by said plurality of bytes stored in register R1 prior to said extraction step.

1 Claim, 2 Drawing Sheets

SPECIALIZED MILLICODE INSTRUCTION FOR CERTAIN DECIMAL OPERATIONS

BACKGROUND OF THE INVENTION

1. Field of the Invention

This invention relates to improvements in pipelined computer processors that execute relatively simple instructions in hardware controlled execution units and execute relatively complex instructions in a milli-mode architected state with vertical microcode (i.e. millicode) routines executing in the same hardware controlled execution units. More particularly, this invention relates to a set of specialized millicode instructions which reduce the number of millicode instructions and machine cycles required to perform certain decimal operations.

2. Cross Reference to Related Applications

The present United States patent application is related to the following co-pending United States patent applications which are assigned to the assignee of the present application.

Application Ser. No. 08/414,154, filed Mar. 31, 1995, (attorney Docket No. PO9-94-045), entitled "Specialized Millicode Instruction."

Application Ser. No. 08/414,821, filed Mar. 31, 1995, (attorney Docket No. PO9-94-054), entitled "Millicode Read-Only Storage With Entry Point Patch Control."

Application Ser. No. 08/414,977, filed Mar. 31, 1995, (attorney Docket No. PO9-94-056), entitled "Hardware Retry Trap for Millicoded Processor"

Application Ser. No. 08/414,158, filed Mar. 31, 1995, (attorney Docket No. PO9-94-060), entitled "Addressing Extended Memory Using Millicode."

Application Ser. No. 08/414,812, filed Mar. 31, 1995, (attorney Docket No. PO9-94-061), entitled "Mapping Processor State Into A Millicode Addressable Processor State Register Array."

Application Ser. No. 08/414,164, filed Mar. 31, 1995, (attorney Docket No. PO9-94-062), entitled "Linking Program Access Register Number With Millicode Operand Access."

Application Ser. No. 08/414,975, filed Mar. 31, 1995, (attorney Docket No. PO9-94-069), entitled "Priority and Recovery Method For System Serialization (Cask)."

Application Ser. No. 08/414,961, filed Mar. 31, 1995, (attorney Docket No. PO9-95-009), U.S. Pat. No. 5,611,062 entitled "Specialized Millicode Instruction for String Operations."

DESCRIPTION OF THE PRIOR ART

Instruction sets used in computer systems employing so-called Complex Instruction Set Computing (CISC) architecture include both simple instructions (e.g. Load, or Add) and complex instructions (e.g. Program Call, or Load Address Space Parameters). As an example to which the invention has particular relevance, see "IBM Enterprise Systems Architecture/390 Principles of Operation" (Publication Number SA22-7201-02, available from IBM Corporation, Armonk, N.Y.), which is incorporated herein by reference in its entirety. As these computer systems (e.g. IBM System 390) have become more powerful, larger percentages of the instruction set have been implemented using hardware execution units to increase the systems performance. Conventionally, the complex functions are implemented in microcode because building hardware execution units to execute them is expensive and error prone.

Implementing complex functions in microcode provides flexibility to fix problems and expandability in that additional functions can be included later. In certain prior art machines, where much of the processor is hardware controlled, a dedicated microprocessor based execution unit is often provided in order to implement the complex functions. This unit can be microprogrammed to execute complex instructions and complex functions such as handling interrupt conditions.

More recently, prior art proposals have been advanced for machines with a so-called milli-mode operating capability; see, for example, IBM Technical Disclosure Bulletin Vol. 35, No. 4A of September 1992, incorporated herein by reference, and U.S. Pat. Nos. 5,280,593 and 5,226,164 assigned to the assignee of this invention and also incorporated herein by reference.

A milli-mode operation enables implementation of complex functions in a large, hardware controlled, pipelined, general purpose digital computer without a microprocessor. Millimode implements these complex functions with the flexibility provided by firmware and avoids a packaging problem introduced by the inclusion of microprocessor hardware. Rather than a microprocessor, milli-mode uses the preexisting dataflow and hardware controlled execution units of a pipelined processor to accomplish complex functions. Additional hardware controlled instructions (private milli-mode only instructions) are added to provide control functions or to improve performance. These private milli-mode instructions augment the architected instruction set. Milli-mode routines can intermingle the milli-mode only instructions with architected instructions to implement complex functions.

Milli-mode detection logic in the instruction decode logic detects the requirement to enter milli-mode, and this causes millicode routines to be fetched. The millicode routines are decoded by the decoder hardware and dispatched for execution in the same way as the architected macro-instructions (system-mode instructions).

Practically all of the architected macro-instructions that are implemented as hardware controlled instructions can be executed in milli-mode. The set of instructions available in milli-mode can be considered to be an alternate architecture that the processor can execute.

The hardware-executed instructions which are valid only for millicode are generally of a format and a function similar to those of ESA/390 instructions. In this way, the unique hardware required to implement these instructions is minimized, and the simplicity of the hardware design is maintained. This simplicity of hardware controls is a chief advantage of millicode over other forms of internal code (e.g. microcode) which require considerably more unique hardware.

A disadvantage of a millicoded design is that some complex operations require more internal code instructions and/or more machine cycles than with some forms of microcode. In some cases, this is due to the inefficiency of the base instruction set (e.g. the hardware-executed ESA/390 instructions) when used to perform these complex operations. Depending on the frequency with which these operations are performed, the impact on overall system performance may be significant.

Specifically, the base instruction set on a millicoded implementation of ESA/390 is not well suited to efficient emulation of the ESA/390 instructions pack, unpack, multiply decimal, and divide decimal. The pack and unpack instructions operate on byte (8 bits) and nibble (4 bits) units of data to convert decimal operands between packed and zoned formats. The multiply decimal and divide decimal instructions perform the indicated arithmetic operations on packed decimal operands in storage. In the processor for which this invention is intended, add decimal, subtract decimal, compare decimal, and zero and add decimal instructions are implemented with hardware controls.

An object of this invention is the provision of a specialized millicode instruction set which reduces the number of millicode instructions and machine cycles required to perform a certain complex operation that is called relatively frequently.

Another object of this invention is the provision of a specialized millicode instruction set which conforms to an instruction format for normal (i.e. non-millicode) operation and which requires a minimum of hardware unique to the specialized set.

Briefly, this invention contemplates the provision of the following specialized millicode instructions:

Pack Register

This instruction takes the rightmost 4 bits from each of the 8 bytes of a pair of MGRs and packs these into a single MGR. This provides the core function of the ESA/390 instruction pack, but operates on fixed-length operands (8 byte source and 4 byte destination) and makes no special provision for a decimal sign. The millicode routine implementing the pack instruction is responsible for accessing only the correct bytes of storage and for handling the last byte of the operands according to the ESA/390 definition.

Unpack Register

This instruction takes the eight 4-bit "nibbles" (hexadecimal digits) of an MGR and unpacks these into the 8 bytes of a pair of MGRs, placing each source nibble in the rightmost 4 bits of the corresponding byte in the destination MGR pair and setting the leftmost 4 bits in each destination byte to values specified by millicode registers R3 and R3+1. This provides the core function of the ESA/390 instruction unpack, but operates on fixed-length operands (4 byte source and 8 byte destination) and makes no special provision for a decimal sign. The millicode routine implementing the unpack instruction is responsible for accessing only the correct bytes of storage and for handling the last byte of the operands according to the ESA/390 definition.

Add Decimal Register

This instruction adds the two unsigned packed-decimal numbers contained in two pairs of MGRs. The addition is performed according to the rules of ESA/390 decimal arithmetic, except that there is no sign digit and the decimal digits are not checked for validity. The result of the addition replaces the value in one of the MGR pairs, and the condition code indicates whether the value is zero and whether there was an overflow. This instruction is designed to accelerate the millicoded implementation of the ESA/390 instruction multiply decimal, which uses decimal addition both to form a table of multiples of one operand and to add the partial products to form the final product. The millicode routine for multiply decimal can verify digit validity in the original operands and form internal operands of fixed length, and can form the correct sign for the product independently of the magnitude. Thus digit checking, storage alignment and length, and sign handling can be done outside of the core arithmetic operations. This allows these core operations, using the add decimal register instruction, to avoid these steps, yielding substantially faster execution.

Subtract Decimal Register

This instruction subtracts the one unsigned packed-decimal number contained in a pair of MGRs from another such number contained in another pair of MGRs. The subtraction is performed according to the rules of ESA/390 decimal arithmetic, except that there is no sign digit and the decimal digits are not checked for validity, and the result is not recomplemented if the second operand is greater than the first operand. The result of the subtraction replaces the value in one of the MGR pairs, and the condition code indicates whether the value is greater than, equal to, or less than zero; in the last case (less than zero), the result saved in the MGRs is the 10's-complement of the magnitude of the difference. This instruction is designed to accelerate the millicoded implementation of the ESA/390 instruction divide decimal, which uses decimal subtraction to determine the quotient. The millicode routine for divide decimal can verify digit validity in the original operands and form internal operands of fixed length, and can form the correct sign for the product independently of the magnitude. Thus digit checking, storage alignment and length, and sign handling can be done outside of the core arithmetic operations. Furthermore, if the result of the subtraction is negative, the algorithm for divide decimal does not require the correct result (only a condition code indication) , so additional cycles are saved by not recomplementing the negative result (to get a correct magnitude) but instead leaving the result in the 10's complement form in this case. This allows the core operations for divide decimal, using this subtract decimal register instruction, to avoid these steps, yielding substantially faster execution.

Although the ESA/390 decimal instructions operate on storage operands, these millicode instructions all take their operands from millicode general registers (MGRs), which are analogous to ESA/390 general registers and are available for millicode use only. It is thus the responsibility of the millicode routines to fetch storage operands into and store operands from these MGRs, which is done using normal load and store operations.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

This following exemplary embodiment of the invention is applicable in the overall context of a system generally conforming to IBM 390 system architecture. A more detailed description of the conventional elements of such a 390 system processor can be found, for example, in U.S. Pat. No. 4,901,233 to John S. Liptay, assigned to the same assignee as the present invention, and incorporated by reference, in its entirety, as if printed in full below. While the System 390 environment will be used as an example, it should be understood that the present invention is also readily applicable to other IBM (e.g. IBM System 370) and non-IBM architectures as well.

While not limited thereto, the invention is particularly well suited for use in conjunction with the enhanced error recovery system described in copending application attorney docket PO9-93-035, Ser. No. 08/149,260, filed Nov. 9, 1993, assigned to the assignee of this application, and also incorporated herein by reference.

Figure 1:
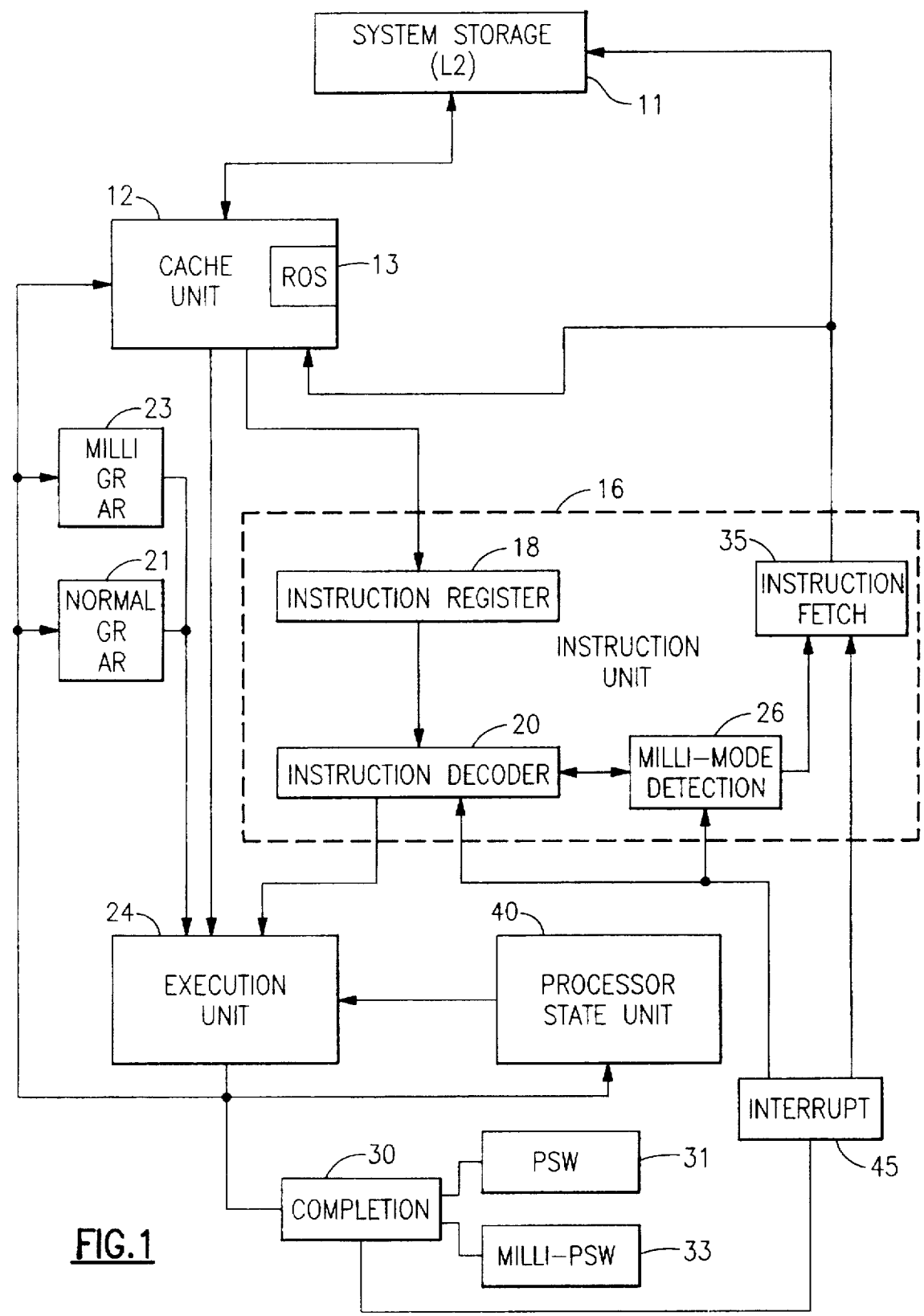
FIG. 1 is a block diagram illustrating the components of a millicode system in accordance with a preferred specific embodiment of the invention.

Referring now to FIG. 1, elements of a system relevant to this invention include a system storage 11, and a cache memory unit 12. The system storage 11 contains the instructions that the processor is executing as well as the data those instructions are manipulating. The cache memory unit 12, which includes a copy of the data and instructions the processor is presently executing, in this preferred embodiment is a cache providing interleaved double word addressing. The cache memory 12 logically includes a contiguously addressable read only store 13, in which code for executing certain frequently invoked milli-mode routines is stored.

An instruction unit subsystem 16 includes an instruction buffer (not shown in FIG. 1), instruction registers 18 and an instruction decoder 20. The instruction unit subsystem receives macro-instructions, millicode instructions, and data from the cache memory unit 12. Instructions are parsed and placed into the instruction registers 18. The decoder 20 reads the contents of the instruction registers 18, decodes the instruction (or causes an operation exception), and passes the instruction to an instruction queue for sequential execution by a hardware execution unit 24. Each hardware execution unit 24 has access to a set of general purpose registers and access registers 21 for normal macro-code instruction execution and to a set of general purpose registers and access registers 23 for millicode instruction execution. Control logic controls the exchange of data between the two sets of registers when beginning or terminating a millicode routine.

Milli-mode detection logic 26 is coupled to the instruction registers and detects when a macro-instruction, which is being decoded, is of a type that is to be interpreted in a milli-mode operation. When this occurs, the milli-mode detection logic 26 generates an entry point address and passes this address along to the instruction fetch control logic 25 and places the decoder 20 into a milli-mode operating state. In this state the decoder is enabled to decode milli-mode instructions. Milli-mode instructions are vertical microcode, consisting of a mixture of regular microcode instructions and special milli-mode only instructions, all of which can be executed in the execution unit 24. The special instructions provide control functions needed by the millicode routines. The set of millicode routines reside outside of the program addressable storage.

The system effects of an executed instruction are architecturally visible in the completion logic 30. Signal lines between the completion logic 30 and the decoder 20 allow the decoder 20 to keep track of instruction completion. A program status word (PSW) in register 31 controls execution of the macro-program. Similarly, the system also includes a milli-PSW register 33, which controls execution of the milli-routine. Both the execution unit 24 and the completion logic 30 are connected to read from/write to the PSW and the milli-PSW registers. Thus, at any given point the execution units or the completion logic can read or update the appropriate one of the PSW and/or milli-PSW registers. A processor state unit 40 maintains the entire updated status of the architected system both in regular mode and milli-mode operation. In the event of a detected error, the processor state unit 40 provides a resource to recreate the status of the system from a check point state in order to allow a retry of the error causing operation.

Milli-mode is enabled when the milli-mode detection logic 26 recognizes that the macro-instruction being decoded is to be implemented with millicode. In response to this recognition, the detection logic 26 signals the decoder 20, the instruction fetch controls 35 and register controls in the execution unit 24. In response to the milli-mode recognition signal from the detection logic 26, the decoder 20 suspends macro-mode decoding, the execution unit register control copies the contents of the GPRs 21 to the milli-registers 23 and causes the system to subsequently use the milli-registers 23. The milli-mode detection logic 26 generates a millicode entry point address.

The entry point address (generated by the milli-mode detection logic 26) is used by the control logic 35 to address the cache 12. Milli-instructions from the cache are sent to the instruction registers 18 where the decoder 20 decodes them and schedules them for execution.

When the processor enters milli-mode, it executes and completes the macro-instructions already in the pipeline conceptually prior to the instruction that caused entry into milli-mode. As the processor completes the macro-instructions, it updates the appropriate GPRs. At the same time, the processor decodes and executes the milli-instructions that implement the macro-instruction that caused entry into milli-mode.

At some point the macro-instruction immediately prior to the instruction that caused entry to milli-mode will be indicated completed in the completion logic 30. Only then does the processor begin to complete the milli-instructions. The processor then continues decoding, executing and completing the milli-instructions.

Eventually, the detection logic 26 recognizes a millicode END (MEND) milli-instruction. When the detection logic 26 detects a MEND milli-instruction, it causes the processor to cease fetching milli-instructions. Further, when MEND is detected, the detection logic puts the decoder in macro-mode and causes the processor to begin fetching macro-instructions. Millicode explicitly updates all registers, so there is no transfer of register content when going from milli-mode operation to regular operation.

Completion of a MEND milli-instruction causes the processor completion logic to begin completing macro-instructions.

The processor can also enter milli-mode in response to an interrupt. When the completion logic detects an interrupt, the interrupt priority logic 45 determines that an interrupt is to be serviced and it signals the instruction fetch unit, causing the decoder to initiate milli-mode. The recognition of an interruption condition causes the processor to halt macro-mode execution at the next interruptible point. The interrupt priority logic 45 also generates control inputs which are used by the milli-mode detection logic to generate an entry point address with which to address the cache. These milli-instructions are sent to the instruction registers where the decoder decodes them and schedules them for execution at the appropriate hardware execution elements.

The processor proceeds to decode, execute and complete the milli-instruction in the milli-routine for interrupts. Eventually, the decoder recognizes a MEND milli-instruction. This causes the decoder to stop decoding in milli-mode. Depending on whether or not there are additional interrupts that require servicing, the decoder hardware will either redo the interrupt process or return to decoding macro-instructions from the cache.

Pack Register

Figure 2:
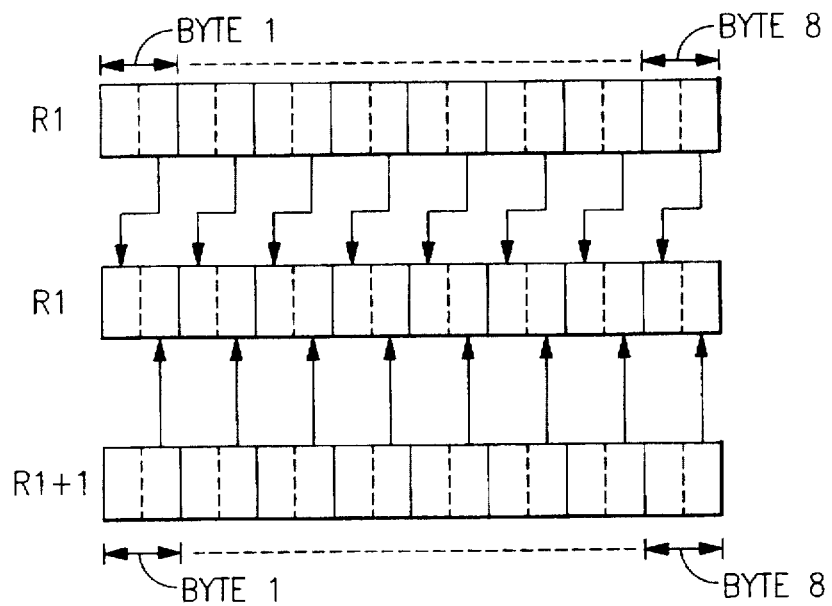
FIG. 2 illustrates the operation of the pack instruction in accordance with the teaching of this invention.

Referring now to FIG. 2, in the execution of a pack register $R_1$ instruction:

| 'B2DC' | ///////////| R1 | | R1 | |
|---|---|---|---|---|---|
| 0 | 16 | 24 | | 28 | 31 | the rightmost hexadecimal digits from each of the eight bytes in the millicode GR pair specified by $R_1$ are packed into millicode GR $R_1$. That is, if, for example, the hexadecimal digits in MGR pair $R_1,R_1+1$ are as follows:

*S A T B U C V D W E X F Y G Z H* then the hexadecimal digits in the result in $R_1$ are:

*A B C D E F G H*

Millicode GR $R_1+1$ is not changed.

The register pair $R_1$ must be specified in both the $R_1$ and $R_2$ fields of the RRE instruction format (i.e. bits 24:27 and 28:31).

If different registers are specified in these two fields, results of this instruction are undefined.

The condition code is not changed.

This instruction is intended for use in the implementation of the ESA/390 instruction PACK.

Unpack Register

Figure 3:
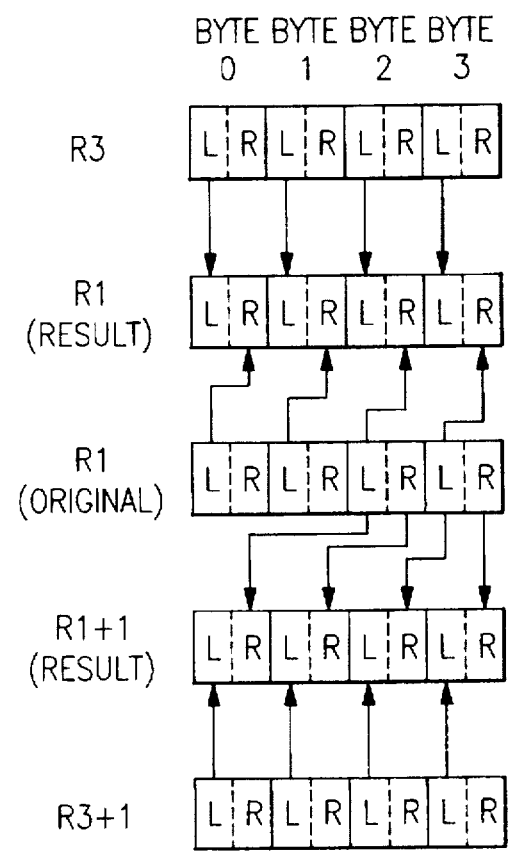
FIG. 3 illustrates the operation of the unpack instruction.

Referring now to FIG. 3, in the execution of an unpack registers $R_1,R_3$,

| 'B2DB' | R3 | //// | R1 | R1 |
|---|---|---|---|---|
| 0 | 16 | 20 | 24 | 28  31 | the hexadecimal digits in millicode GR $R_1+1$ are unpacked into the rightmost digits of each byte of millicode GR pair $R_1,R_1+1$. The leftmost digits of each byte of millicode GR pair $R_1,R_1+1$ are replaced by the corresponding hexadecimal digits of millicode pair $R_3,R_3+1$. That is, if the hexadecimal digits in MGR $R_1+1$ and in MGR pair $R_3,R_3+1$ are as follows:

$R_1+1$: *A B C D E F G H*

$R_3$: *S-T-U-V-* $R_3+1$: *W-X-Y-Z-* then the hexadecimal digits in the result in MGR pair $R_1,R_1+1$ are:

$R_1$: *S A T B U C V D* $R_1+1$: *W E X F Y G Z H*

The register pair $R_1$ must be specified in both the $R_1$ and $R_3$ fields of the RR1 instruction format (i.e. bits 24:27 and 28:31). If different registers are specified in these two fields, results of this instruction are undefined.

The condition code is not changed.

This instruction is intended for use in the implementation of the ESA/390 instruction UNPACK.

Add Decimal Register

In the execution of an add decimal registers $R_1,R_2$,

| 'B2DC' | ///////////| R1 | R1 | |
|---|---|---|---|---|
| 0 | 16 | 24 | 28 | 31 | the packed decimal value in millicode GR pair $R_2$ is added to the packed decimal value in millicode GR pair $R_1$ and the packed decimal result is stored in millicode GR pair $R_1$. The addition is performed using decimal arithmetic, as for the ESA/390 instruction add decimal, except for the following:

1. There is no sign digit, and the operands are treated as positive decimal numbers.
2. The operand length is fixed at 16 digits.
3. The digits are not checked for validity, and no data exception is possible.
4. Decimal overflow exceptions are blocked regardless of PSW.21.

The condition code is set as follows:
CC Condition
0 Result is zero
1 <not used>
2 Result is greater than zero
3 Overflow This instruction is intended for use in the implementation of the ESA/390 instruction MULTIPLY DECIMAL.

Subtract Decimal Register

In the execution of subtract decimal registers $R_1$, $R_2$,

| 'B2DC' | ///////////| R1 | R1 | |
|---|---|---|---|---|
| 0 | 16 | 24 | 28 | 31 | the packed decimal value in millicode GR pair $R_2$ is subtracted from the packed decimal value in millicode GR pair $R_1$ and the packed decimal result is stored in millicode GR pair $R_1$. The addition is performed using decimal arithmetic, as for the ESA/390 instruction subtract decimal, except for the following:

1. There is no sign digit, and the operands are treated as positive decimal numbers.
2. The operand length is fixed at 16 digits.
3. The digits are not checked for validity, and no data exception is possible.
4. If the result is negative, the value stored in millicode GR pair $R_1$ is the 10's complement of the absolute value of the result.
5. The condition code is set as follows:
CC Condition
0 Result is zero
1 Result is less than zero
2 Result is greater than zero
3 <not used>

Note that decimal overflow is not possible since the operands have the same length and are both positive.

This instruction is intended for use in the implementation of the ESA/390 instruction DIVIDE DECIMAL.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. In a pipelined computer processor, which executes a relatively simple instruction set in a hardware controlled execution unit and executes a relatively complex instruction set in a milli-mode architected state with a millicode sequence of simple instructions in said hardware controlled execution unit, a millicode method for packing the hexadecimal digits from a plurality of bytes in each of two millicode registers (R1,R2) into one of the two millicode registers, comprising the steps of:

storing a millicode instruction that includes a field specifying a first millicode register (R1) and a field specifying a second millicode register (R2);

fetching said millicode instruction from storage; and extracting the rightmost hexadecimal digit from each of a plurality of bytes stored in millicode register R1 and the rightmost hexadecimal digit from each of a plurality of bytes stored in millicode register R2; and storing hexadecimal digits from said extracting step in in millicode register R1 with each hexadecimal digit extracted from a byte in register R1 and from a byte in register R2 stored in millicode register R1 in register R1 positions occupied by said plurality of bytes stored in register R1 prior to said extraction step.

\* \* \* \* \*

UNITED STATES PATENT AND TRADEMARK OFFICE
CERTIFICATE OF CORRECTION

PATENT NO. : 5,754,810
DATED : May 19, 1998
INVENTOR(S) : Charles Franklin Webb et al.

It is certified that error appears in the above-identified patent and that said Letters Patent is hereby corrected as shown below:

Column 7, line 18 should be--SATBUCVD  WEXFYGZH--; Column 7, line 38, should be--'B2DD' $R_3$ ////  R1  R1--; Column 7, line 53, should be $R_3$: S-T-U-V-  $R_3$+1: W-X-Y-Z--; Column 7, line 59, should be --$R_1$ : SATBUCVD  $R_1$ +1: WEXFYGZH--

Signed and Sealed this

Twenty-ninth Day of June, 1999

*Attest:*

Q. TODD DICKINSON

*Attesting Officer*   *Acting Commissioner of Patents and Trademarks*